United States Patent
Stein et al.

[19]

[11] Patent Number: 6,164,192

[45] Date of Patent: *Dec. 26, 2000

[54] CORN POPPING KETTLE ASSEMBLY WITH DAMPING MECHANISMS

[75] Inventors: Andrew M. Stein, Floral Park; Andrew Jinks, Amityville, both of N.Y.

[73] Assignee: Six Corners Development, Inc., Amityville, N.Y.

[*] Notice: This patent is subject to a terminal disclaimer.

[21] Appl. No.: 09/377,537

[22] Filed: Aug. 19, 1999

Related U.S. Application Data

[60] Division of application No. 08/938,372, Sep. 26, 1997, Pat. No. 5,941,164, which is a continuation-in-part of application No. 08/697,224, Aug. 21, 1996, Pat. No. 5,699,720, which is a continuation of application No. 08/328,325, Oct. 24, 1994, Pat. No. 5,555,792.

[51] Int. Cl.[7] .......................................................... A23L 1/18
[52] U.S. Cl. ......................... 99/323.8; 99/323.9; 99/323.5
[58] Field of Search ................................ 99/323.8, 323.9, 99/323.5, 323.6, 323.7, 323.11

[56] References Cited

U.S. PATENT DOCUMENTS

| | | | |
|---|---|---|---|
| 2,743,663 | 5/1956 | Bruntjen | 99/323.9 X |
| 2,907,264 | 10/1959 | Bushway | 99/323.9 X |
| 4,182,229 | 1/1980 | VandeWalker | 99/323.6 |

*Primary Examiner*—Reginald L. Alexander
*Attorney, Agent, or Firm*—Pennie & Edmonds LLP

[57] ABSTRACT

A kettle assembly for popping corn comprises an aluminum popping bowl with a sidewall aperture. The sidewall aperture introduces cooking oil directly into the popping bowl, and is in communication with an oil conduit leading from a cooking oil reservoir. The aperture is sized such that unpopped kernels do not become lodged in the aperture so as to block the flow of oil through the oil conduit. A housing may be provided to support the bowl. A pivoting axis on which the kettle assembly pivots from vertical to horizontal positions is also supported by the housing. A damping mechanism is mounted on a top surface of the housing so as to provide for controlled motion of the kettle assembly as it pivots from a vertical to a horizontal position. Another damping mechanism is connected between the housing and the pivoting axis. In one configuration this damping mechanism generates a damping force for controlling pivoting motion of the kettle assembly. In another configuration, this arrangement automatically generates pivoting forces to pivot the kettle assembly.

8 Claims, 8 Drawing Sheets

CORN POPPING KETTLE ASSEMBLY WITH DAMPING MECHANISMS

This application is a divisional of application Ser. No. 08/938,372, filed Sep. 26, 1997 now U.S. Pat. No. 5,941,164, which is a continuation-in-part of application Ser. No. 08/697,224, filed Aug. 21, 1996, now U.S. Pat. No. 5,699,720, which is a continuation of application Ser. No. 08/328,325, filed Oct. 24, 1994, now U.S. Pat. No. 5,555,792.

FIELD OF THE INVENTION

This invention relates to commercial pop corn poppers useful in movie theaters or other places of entertainment. More specifically it relates to efficient, reliable, and safe electrically heated corn popping kettle assemblies and related kettle movement dampening support structures.

BACKGROUND ART

Tasty and efficient preparation of popcorn requires, as well as the pop corn kernels, high heat and cooking oil. The cooking oil functions to coat the corn kernels for insuring even distribution of heat throughout the kernel. The popping apparatus must provide at least these three basic necessities. It must further provide for efficient corn loading and simple delivery of popped corn. Additionally, it is highly desirable that the popping apparatus permit easy and rapid periodic cleaning, be reliable, and allow simple maintenance in case of faults.

Conventional popping apparatus uses thin steel popping bowls. Even though the bowls may be copper plated for increased heat conductivity, they are subject to uneven temperatures, with hot spots forming near heating elements. This results not only in uneven popping but possible burning of the corn kernels. An even temperature produces more flavorful popcorn. Further, the hot bowl surfaces are exposed externally. Since temperatures up to 450° F. are routinely used for corn popping, considerable heat loss and inefficient energy use results. Also the hot surfaces place the operator of the popping apparatus at risk of serious burns. Even momentary contact with a metal bowl at such a temperature can be dangerous.

The cooking oil needed for corn popping must be introduced into the popping bowl. Cooking oil distribution is a particular problem with prior devices. The oil is generally preheated to nearly popping temperature and then conventionally conducted through an inverted J-shaped tube and allowed to fall into the popping bowl. Since popping bowls generally must be covered to contain the energetically popping corn, an oil passage through the lid must be provided. This conventional design, involving hot oil falling towards a restricted passage through the popping bowl lid, first, exposes the hot oil to air. This is undesirable as it leads to various types of avoidable oil contamination. Second, if even slight misalignment of the oil tube and the oil passage in the lid occurs, hot oil will spill down the sides of the heated bowl. Since bowls are conventionally electrically heated, spilled oil may be a fire hazard. In any case, the hot oil will oxidize on the bowl to create an unsightly residue difficult to clean. Thus, such spillage is both a possible fire safety hazard and an immediate cleaning problem. Access to these surfaces for routine daily cleaning of these surfaces is difficult. Cleaning requires extra operator attention.

Further, a popping apparatus must meet certain mechanical requirements. This cooking bowl must be easily accessible for kernel loading. Popped corn must be externally delivered during popping and between loads of corn. Conventionally, popping devices provide a hinged lid for loading and overflow during popping along with a pivoting capability for final emptying of the entire popping bowl. A handle to manually pivot the popping bowl is thus required. Typically, a short handle attached directly to the uninsulated, hot popping bowl is provided. During routine operation, the operator must bring a hand near the hot bowl surfaces and grasp a grip attached to a short, hot handle. If the operator's hand slips onto the metal portions of the apparatus, burns are likely. This increases operator risk.

Further, the bowl is generally held in an operative position by a return spring. The required pivoting motion of bowl often is not smooth, the bowl returning to its operative position with extra force, where it will often bounce against its supports. This bounce and vibration makes operation more difficult. It can also mar or even damage the apparatus over time.

Corn poppers of this intended use universally generate the necessary high heat by electric heating elements. The heating elements required are often rated from 5 up to 10 KW. These elements draw high currents. Conventionally, prior devices included mechanical contacts in the high current path to facilitate pivoting of the kettle. These contacts are less reliable than current paths not requiring mechanical interruption. Also, conventional heater control circuitry uses thermostats. These are electromechanical parts also prone to failure. Finally, even the heating elements and their passive contacts, repeatedly subject to high heat and thermal stresses, will fail. These electromechanical failures must be minimized to the maximum possible extent to increase popping device availability.

When they occur, these and other types of failures must be easily and rapidly repaired. Prior popping device assemblies generally involve many washers, spacers, and other mechanical parts. Return springs and elaborate pivot mechanisms add to the complexity of the device. This mechanical complexity makes prior devices difficult to disassemble and reassemble, often beyond the abilities of the average operator staff. Routine repair may thus require special personnel, and results in unnecessary downtime.

Prior corn popping devices have inadequately addressed these problems. The present invention provides coordinated solutions to the problems of a corn popper of increased efficiency, safety, reliability, and maintainability.

SUMMARY

The invention relates to a kettle assembly which provides improved cooking oil introduction and heat distribution. This assembly includes a popping bowl with a generally circular and sloping sidewall and a bottom portion. The sidewall has an aperture for the direct entry of cooking oil into the bowl. The bowl is also provided with a lid. One portion of the lid is fixed to the bowl; another portion is moveable to allow loading of corn and overflow and removal of popped corn. The bowl includes means for heating the oil coated corn kernels for popping.

In a refinement of this version, the kettle assembly is associated with a fluid conduit along which fluid cooking oil is conducted from a reservoir. The tube is in fluid association with the aperture in the cooking bowl for directly injecting the oil into the bowl. In a preferred version, the diameter of the aperture is sized such that unpopped kernels do not lodge themselves in the aperture and block the flow of oil through the tube. Also in a preferred version, the conduit is a resistant tube connecting directly to a nozzle inserted in the sidewall of the bowl. In this manner, the prior art problems of air exposure and spillage of the cooking oil are solved.

The bowl of the kettle assembly is preferably made substantially of cast aluminum. The bowl includes a recessed area in the outer surface of the bottom portion for receiving the heating means, which preferably is a coil of heating elements. The heating elements are in thermal contact with the bowl, and the heat provided thereby is uniformly distributed by conduction in the bowl. This provides heat distribution to the popping corn, as well as improved heat efficiency and safety.

The kettle assembly advantageously includes a material for insulating the sidewall of the popping bowl. The insulating material is generally placed adjacent the sidewall and an outer sheath is used to protect and retain the insulating material in position. The preferred insulating material is a ceramic sheet or blanket, and the preferred sheath material is a sheet of steel or aluminum. Thus the outer surface of the kettle assembly is significantly cooler than the temperature of the bowl. In addition to uniformly distributed heat in the popping bowl, heat efficiency is improved, and the danger of operator burns is lessened.

The kettle assembly is further provided with a handle member which acts to pivot the bowl from an operative, substantially horizontal position to an emptying, substantially vertical position. The handle member is preferably attached at the pivot axis of the bowl. The handle member includes an elongated protective gripping means at the opposite end of the connection to the pivot axle.

The kettle assembly advantageously includes a base member for supporting the bowl. The base member has dependent legs which accept a pivot axle. The legs, axle and base are configured and dimensioned to allow the kettle assembly to pivot between a substantially horizontal and a substantially vertical position. By providing additional leg members, the same kettle assembly components can be configured for left or right handed operation. The bowl is spaced away from the base to define an open space in which electric wires and other feeds can pass.

The kettle assembly, base and pivot axle can be mounted for pivoting on a housing which also supports the kettle assembly. A damping means, for example, a cylinder and piston arrangement, may be connected between the pivot axle and the housing. The cylinder and piston has dual configurable functions. In a first configuration, the fluids on either side of the piston communicate. Thereby the cylinder and piston generate an adjustable force which dampens the pivoting of the kettle assembly. In a second configuration, the cylinder and piston are provided with a pneumatic supply for generating a pivoting force. Thereby, pivoting of the kettle assembly can be automatically controlled.

Another damping means may also be provided to provide controlled motion of the kettle assembly as the assembly is returned from a substantially vertical position to a substantially horizontal position. This damping means is mounted on a top surface of the housing, adjacent a footpad which is also mounted on the top surface of the housing. The damping means provides a resistance force as the kettle assembly approaches the footpad. The resistance force provided by the damping means preferably may be adjusted.

In this manner, pivoting of the kettle assembly is controlled at the extremes of the pivoting ranges. Further, provision for automatic operation is made. By automatically actuating the pneumatic feed in concert with other controls the popping of the corn can be substantially automated.

In another embodiment of the invention, the device includes provision for routine feeds to the kettle assembly. First, the cooking oil conduit is routed to the aperture in the side of the popping bowl. Second, electrical wires for energizing and controlling the heating elements are routed to the recess on the outer bottom surface of the popping bowl. These feeds are routed from the housing through communicating chambers. A chamber in one of the leg members communicates with the space underneath the bowl. This chamber in turn communicates with a chamber in the pivot axle. The chamber in the pivot axle in turn communicates with the base housing. These chambers are all configured and dimensioned to permit passage of the necessary conduit and wires. In this manner, necessary cooking oil and power can be fed to the kettle assembly in a protected manner. These feeds are not subject to accidental injury or misalignment during operation.

The popping bowl sidewall may have a substantially flat portion and a sloping portion which facilitates delivering popped corn from the bowl. A lid to restrain popping corn is generally attached to the top of the sidewall. Over the flat portion the lid is fixed. Over the sloping portion, the lid is hinged for access to the bowl. The lid is attached with thumbscrews which are captive in the lid. The thumbscrews are knurled for a good grip. Consequently the lid can be quickly removed entirely by hand.

Further, in this version, an agitator mechanism for mixing the corn kernels with the cooking oil and for insuring even popping of all the corn is provided in the bottom of the popping bowl. The agitator is powered by a shaft which enters the bowl through an aperture in the bottom. This shaft is protected by a bushing with a raised shoulder which prevents any fluid cooking oil remaining and not coating the kernels from exiting the bowl through the aperture. The interior of the popping bowl and the agitator mechanism are coated with Teflon™ or nickel-Teflon™ for easy cleaning.

In this manner access to the popping bowl is made easy for corn loading, popping is enhanced, and delivery simplified. Further, routine cleaning can easily be done by hand. During cleaning, no components need be disengaged from the kettle assembly other than the lid member. There are no nuts, washers, or other small pieces to loose.

Another feature of this invention relates to improvements in heating element control. Since an electric heating element is generally used to heat the bowl and contained corn, wires to energize the heating element may be conducted from the housing through the pivot axle into a leg member and then into the space under the bowl for connection to the heating element. Means for sensing popping bowl temperature are placed in good thermal communication with the bowl. In a preferred version, these means constitute a thermocouple. The temperature sensing means activates a controller which energizes and de-energizes the heating elements to maintain a preset temperature. The preset temperature can be controlled by the operator. Further, an independent temperature sensing means in good thermal contact with the popping bowl is set to the maximum safe operating temperature of the kettle assembly. When this temperature is reached, the heating elements are de-energized. This safety override prevents dangerous temperatures from ever being reached. In this manner an adjustable temperature may be accurately and safely maintained. This allows tuning of the corn popping conditions as needed.

BRIEF DESCRIPTION OF THE DRAWINGS

Additional objects and features of this invention will be apparent from a study of the detailed description and the accompanying drawings wherein.

DETAILED DESCRIPTION OF THE PREFERRED EMBODIMENTS

Figure 1:
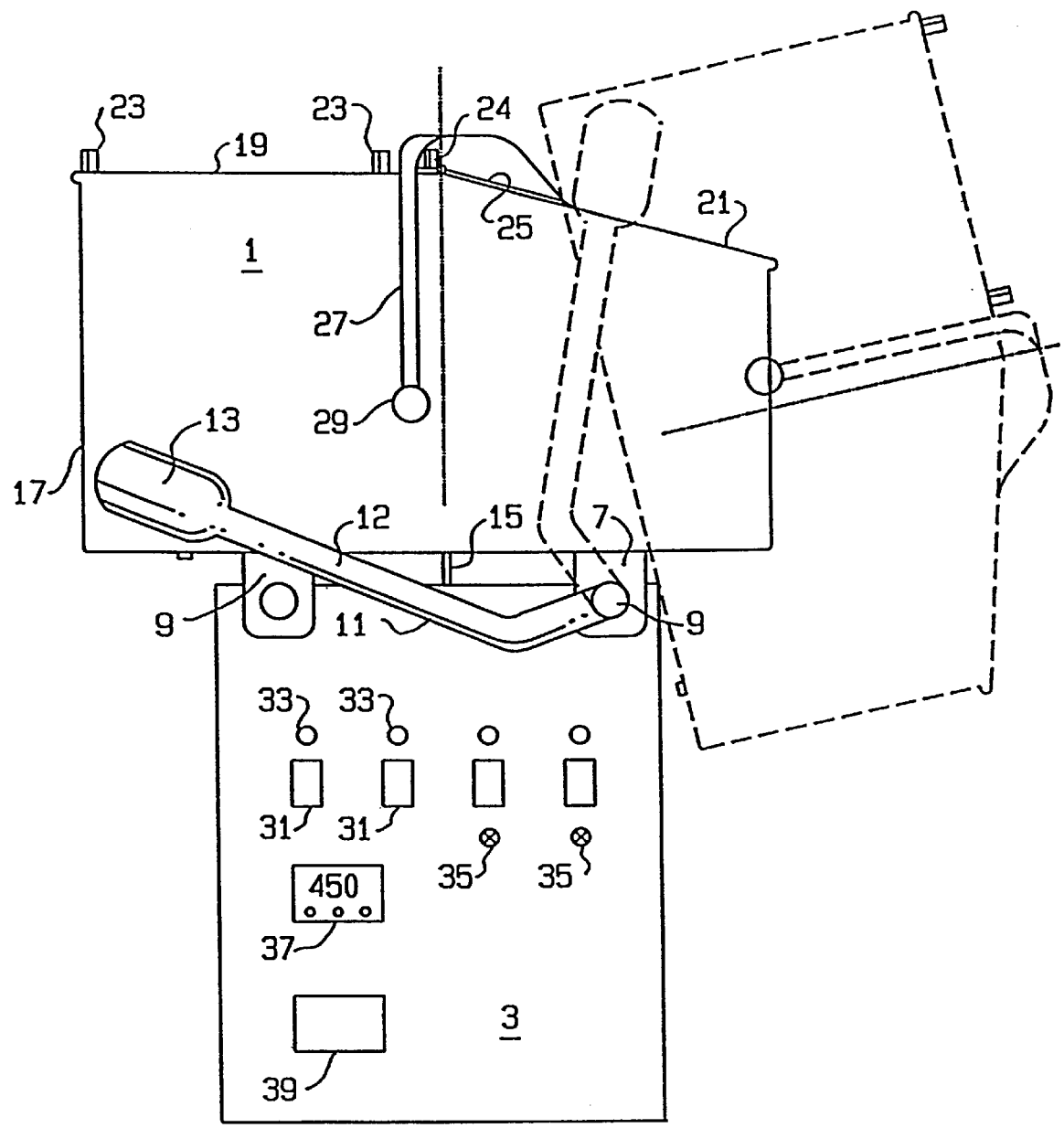
FIG. 1 shows overall view of the popcorn popper apparatus of this invention.

A plan view of the apparatus of this invention is shown is FIG. 1. In use, it is intended that the entire apparatus be mounted within a popcorn merchandising device for creating and replenishing a supply of popcorn for sale. Such merchandising devices are commonly found in movie theaters and other places of public entertainment. In the preferred version, an operator performs the manipulations necessary to run the apparatus. In alternative versions, some or all the manual operations would be automated using a programmable logic controller.

Turning to FIG. 1, the apparatus comprises two principal mechanical sub-assemblies: the kettle assembly 1, and the base housing assembly 3. Corn is popped in the kettle assembly in the presence of cooking oil and high heat. The high temperatures, typically from 450 to 470° F., required for optimum popping of popcorn are generated by electric heating elements in the kettle. The base functions to support the kettle assembly, to provide paths for electric power and cooking oil required by the kettle assembly, and to house all necessary electric controls. The general functioning of the device is best appreciated after a preliminary description of the kettle assembly components.

Turning to FIG. 2, bowl 51 holds the corn to be popped along with necessary oil. Bowl 51 is mounted on base 53, which has front attachment legs 7 and 9 and rear attachment leg 55. Hole 63 in the right front attachment leg is coaxial with hole 65 in the right portion of the rear attachment member. These holes define an axis for attachment of a pivot axle. The bowl has a cylindrical sidewall with the rear portion 61 of constant height and a sloping front portion 59, which facilitates emptying of the contents of the kettle. If desired, the bowl can be made in a rectangular or square configuration, and can be made of welded metal rather than cast.

Returning now to FIG. 1, cylindrical sheathing 17 is mounted on base 53 to surround bowl 51 and base for protecting interior components, and creating a pleasing appearance. Any heat resistant, easily cleanable material can be used. In the preferred version the sheathing is stainless steel or aluminum. The kettle assembly is mounted with pivot axis 9 at the upper, right portion of the base housing 3. The attachment legs and pivot axis are dimensioned and configured to permit rotation of the kettle assembly from the horizontal position shown, in which kettle assembly 1 rests in an operative horizontal position on the base housing 3, to a substantially vertical emptying position illustrated in dashed outline.

Pivoting is accomplished manually with handle 12. This handle is mounted at the pivot axis 9 and extends away from and the back along the kettle assembly. Handle 12 is provided with a heat insulating and resistant grip 13, configured to minimize the chance of an operator's hand slipping forward onto the potentially hot handle. Handle 12 includes an elongated extension 11 which is configured and dimensioned to place the grip 13 sufficiently far from the point of attachment to avoid heating the handle. In addition, handle extension 11 is preferably attached to pivot axis 9, rather than bowl 51, to further avoid heating of extension 11. This avoids the danger of the operator being burned by an extremely hot handle. In the preferred version, the handle is also made of stainless steel or aluminum.

Left lid 19, preferably of the same material as the sheath, is attached to the rear portion of the bowl with captive thumbscrews 23. These thumbscrews are knurled for a good grip and captive to the lid so that they will not accidentally fall from the lid. Right lid 21 covers the front portion of the bowl. Right lid 21 is hinged to the left lid by hinges 25. These hinges 25 are permanently fastened to the right lid but are attached with captive thumbscrews 24 to the left lid. Handle 27, for opening lid 21, is attached to lid 21 near the hinges 25. This handle is configured to bend up and away from the kettle assembly lid and to the side of the assembly so as to descend along the side of the kettle assembly. Handle 27 terminates at counterweight 29. This counterweight 29 is chosen to be sufficiently heavy so that when the kettle is rotated into a nearly vertical position, the hinged right lid will be opened by the force of the counterweight. The weight, however, must not be so heavy that is unnecessarily restricts the flow of popped popcorn from the bowl when the bowl is horizontal.

Base housing 3 contains electric and oil feeds to the kettle assembly and all electric controls necessary for operation. Illustrated on the base housing are various controls. Switch 39 switches the entire apparatus and includes a protective circuit breaker. Temperature control 37 is for precise control and indication of the popping bowl temperature. Shown is a temperature of 450° F., a desirable popping temperature. Also illustrated are switches 31, indicating lights 33, and push buttons 35. The switches control, for example, heat and light in the enclosing popcorn merchandiser, an agitator to mix corn and oil in the popping bowl, and heat and pump circuits for the cooking oil. Push buttons trigger, for example, timed activations of the cooking oil heater and oil pump. Cooking oil is often supplied in a semi-solid form and stored in a reservoir separate from this apparatus. The oil must therefore be heated for melting and then pumped into the popping bowl. A preferred reservoir, heater and pump are shown in U.S. Pat. No. 5,035,173, the content of which is expressly incorporated herein by reference.

General operation of the device can now be described. Initially, using controls on base housing 3, the operator lights and warms the enclosing popcorn merchandiser, melts cooking oil in its reservoir, and brings the bowl to correct popping temperature. When all is ready, the operator places popping corn into the popping bowl, gaining access to the bowl by lifting hinged lid 21 with handle 27, injects a controlled supply of cooking oil using the oil pump control, and activates the agitator in the bowl. As the corn pops, the expanding bulk of the puffed kernels forces open hinged lid 21, and popped corn spills into the merchandiser. The sloped right lip of the bowl directs the popped corn in the desired direction. After all the load of corn is popped, the operator empties any remaining puffed kernels by pivoting the kettle assembly into a substantially vertical position so that remaining contents of the bowl fall through opened lid 21. This process is repeated for additional loads of popcorn.

Certain advantages of the present invention are apparent from this overview. First there is less danger of burns to the operator. Corn popping requires quite high temperatures which can cause serious burns. Prior devices exposed the high temperature popping bowl directly to the operator. This invention presents a cooler surface to the operator because the hot bowl is enclosed by a sheath. Additionally there is insulation between the sheath and the bowl to lower the external temperature even further. Prior devices attached the handle directly to the bowl. The metal handle by conduction would attain a dangerously high temperature. This invention attaches the handle on the pivot axis at a greater thermal distance from the hot bowl. Additionally it provides a long slip-proof handle grip. Thus the operator has a more secure grip with on a cooler handle for the final emptying operational step.

Second, the popping bowl 51 is easily accessible for quick cleaning. The front 19 and/or back lids 21 can be quickly removed by loosening the attaching thumbscrews and the interior of the bowl exposed. The thumbscrews are captive to the lid and cannot be accidently lost prior to reassembly. Prior devices often required removing numerous wingnuts, which could be easily lost or misplaced.

The bowl is preferably constructed of 1/8" to 1/4" cast aluminum. Aluminum is an efficient, economical, easily cast heat conductor and provides a substantial heat capacity. Thus an easily controlled, highly uniform popping temperature can be maintained throughout the interior of the bowl.

Alternatively, a welded aluminum bowl of square or rectangular shape can be used. Prior devices that use a popping bowl of stainless steel sheet cannot as easily maintain as uniform a temperature. The lower thermal conductivity and thin bowl make hot spots likely. This risks uneven cooking and burning of the corn.

For ease in cleaning, the interior of the bowl 51 is coated with Teflon™ or nickel-Teflon™. Such coating greatly simplifies the removal of oxidized and burned oil residues from the bowl when compared with prior plated sheet metal popping bowls. The entire interior of the bowl is quickly accessible by removing the few thumbscrews holding the lid in place.

Figure 2A:
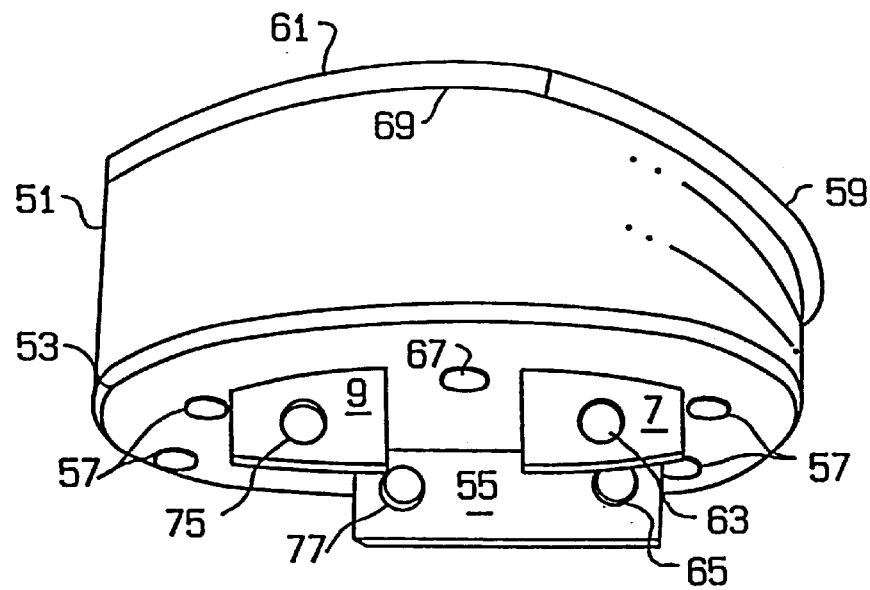
FIGS. 2(a–b) shows views of the kettle assembly of FIG. 1.

Turning to the details illustrated in FIG. 2A, the bowl is attached to the kettle assembly base member with only four bolts 57. As will be seen in regard to FIG. 3, removing these bolts allows the bowl to be freely lifted from the kettle assembly for servicing of its components. Outwardly turned lip 69 engages and seals the kettle assembly sheathing. Aperture 67 allows the agitator motor shaft to engage the agitator rotor shaft (refer to FIG. 4). Other components in FIG. 2A have been previously described.

Figure 2B:
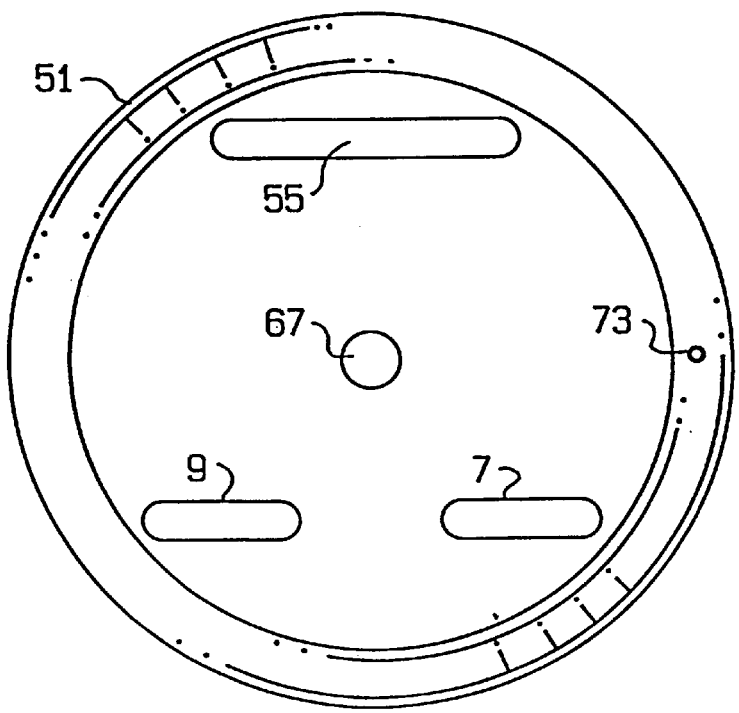

FIG. 2B illustrates an important feature of the present invention, the oil injection aperture 73. As will become apparent shortly, cooking oil is conducted from its reservoir through the base housing into the kettle assembly, and is injected into the popping bowl through aperture 73. During provisioning of cooking oil in the popping bowl in this manner, the oil cannot accidentally leak and is never exposed to air until it is in the bowl. This invention eliminates the disadvantages and hazards of the prior art by fully confining the path of cooking oil from reservoir to popping bowl.

Advantageously, aperture 73 has a diameter which is smaller than that of unpopped corn kernels so that the unpopped kernels do not become lodged in the aperture where they can block the flow of oil. An aperture diameter of between 1/8" and 1/4" prevents normal-sized kernels from becoming lodged in the aperture. In a preferred embodiment, the diameter of aperture 73 is no larger than about 3/16".

In a less preferred embodiment, a screen could be integrated into the aperture such that the flow of oil is not substantially impeded, but that is so constructed such that kernels do not become lodged in the screen.

The sloping sides 71 of the bowl define its interior configuration. Other features, including the supporting legs and configuration of the bowl, illustrated in FIG. 2B have already been described.

Figure 3:
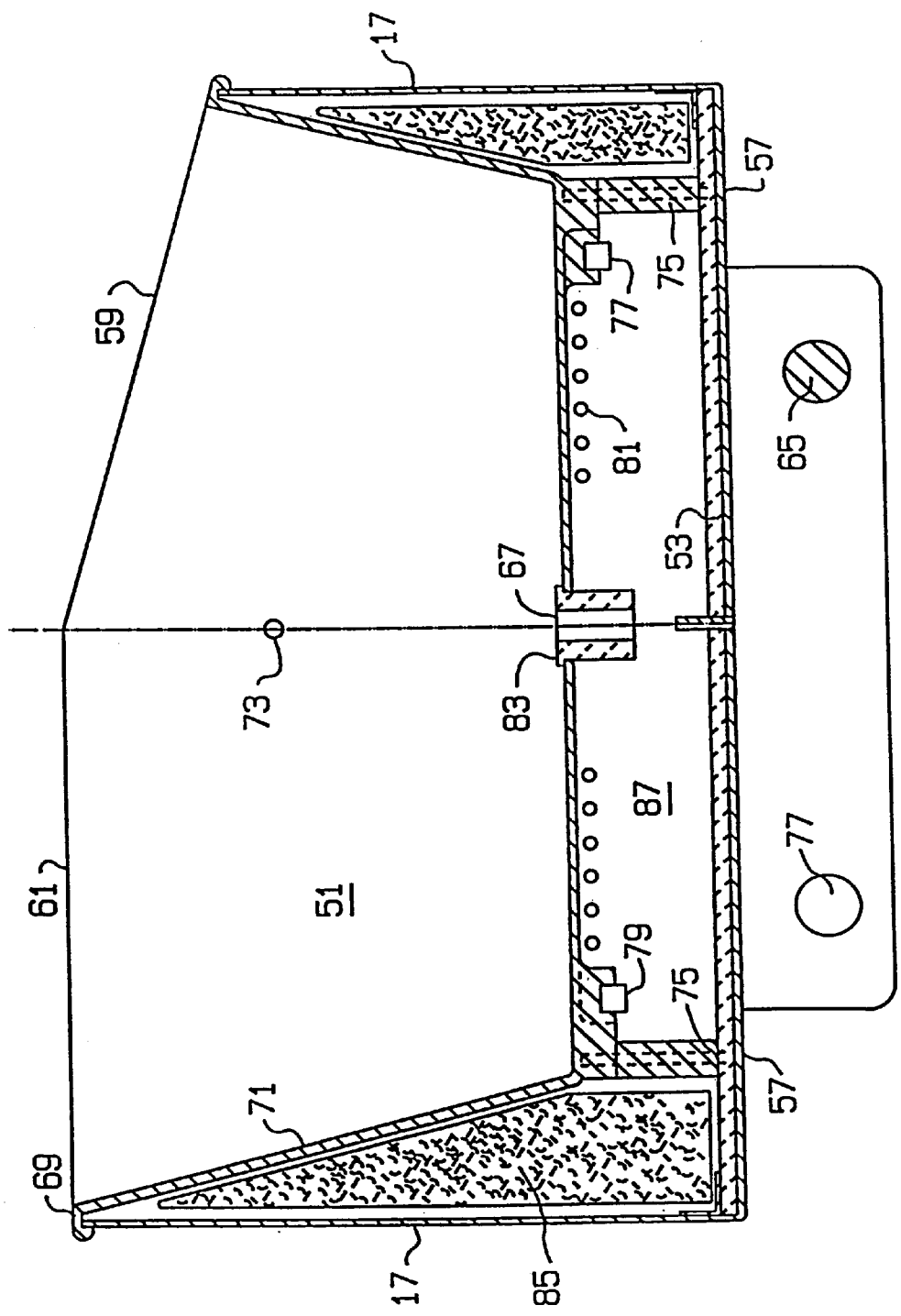
FIG. 3 shows a cross-sectional view of the kettle assembly of FIG. 1.

The popping bowl and base are further illustrated in the cross-sectional view of FIG. 3. Aperture 73 is for cooking oil injection. Base 53 is shown in rearward view with rear attachment leg 55. Leg 55 has pivot hole 65. Optional pivot hole 77 facilitates a left-hand arrangement of the popping apparatus. By positioning the bowl on the base rotated by 180° from the direction shown and by pivoting about the left hand optional pivot holes, the entire apparatus can be configured for left handed operation. Aperture 67 accommodates the agitator shaft. Bushing 83 guides the agitator shaft, and is raised above the bottom of the bowl to prevent hot liquid oil leaking out along the agitator shaft. The kettle assembly sheathing 17 grips base 53, and may be spot welded for even more secure attachment. Insulation 85 between the bowl and the sheathing lowers the sheathing temperature, reducing the danger of operator burns, and retaining heat, increasing energy efficiency. In a preferred version the insulation is a ceramic blanket, up to 1" thick, or multiple sheets of ceramic paper, each sheet being 1/8" thick, from Hunter Sales (Bethel Park, Pa.).

The electric heating elements 81 for heating the bowl are attached to the bottom of the bowl in a conventional manner. These elements 81 are placed in good thermal contact with the bowl, as is temperature control thermocouple 77 and safety thermostat 79. Wires carrying electric power and temperature data from these components run in space 87. These wires have slack roughly equivalent to one half the circumference of the bowl. As will be shortly shown, these wires pass through leg 55 and the pivot axle into the base housing. The coordinated electrical functioning of these elements will be described below.

FIG. 3 further illustrates the ease of disassembly and reassembly of bowl 51 from the kettle assembly 1. This is occasionally required for access to and service of the electrical components, such as the heating elements. After the kettle assembly is pivoted to a substantially vertical position, removal of four bolts 57 frees the attachment of the bowl to the base. The thumbscrews attaching the lids are directly affixed into bowl lip 69, and thus make no mechanical connection to the other kettle components. The bowl can then be lifted up and out of the assembly, taking advantage of the slack in the electrical attachment wires. The cooking oil conduit has similar slack. For reassembly, the bowl is simply placed back on the base. Lips 69 automatically retain securely side sheathing 17. The bolts can be reattached and the lid, if removed, placed back and its thumbscrews tightened.

Aspects of the base housing and the relationship of the kettle assembly to the base housing are illustrated in FIGS. 4(*a*), (*b*), and (*c*) which respectively illustrate: a cross section of the kettle assembly together with the base housing with its front panel removed; a top view of the base housing; and a cross-section of a portion of the base housing with a damper mounted on a top surface of the base housing. Non-essential electrical wiring and other elements are not illustrated in FIGS. 4(*a*), (*b*), and (*c*).

Figure 4A:
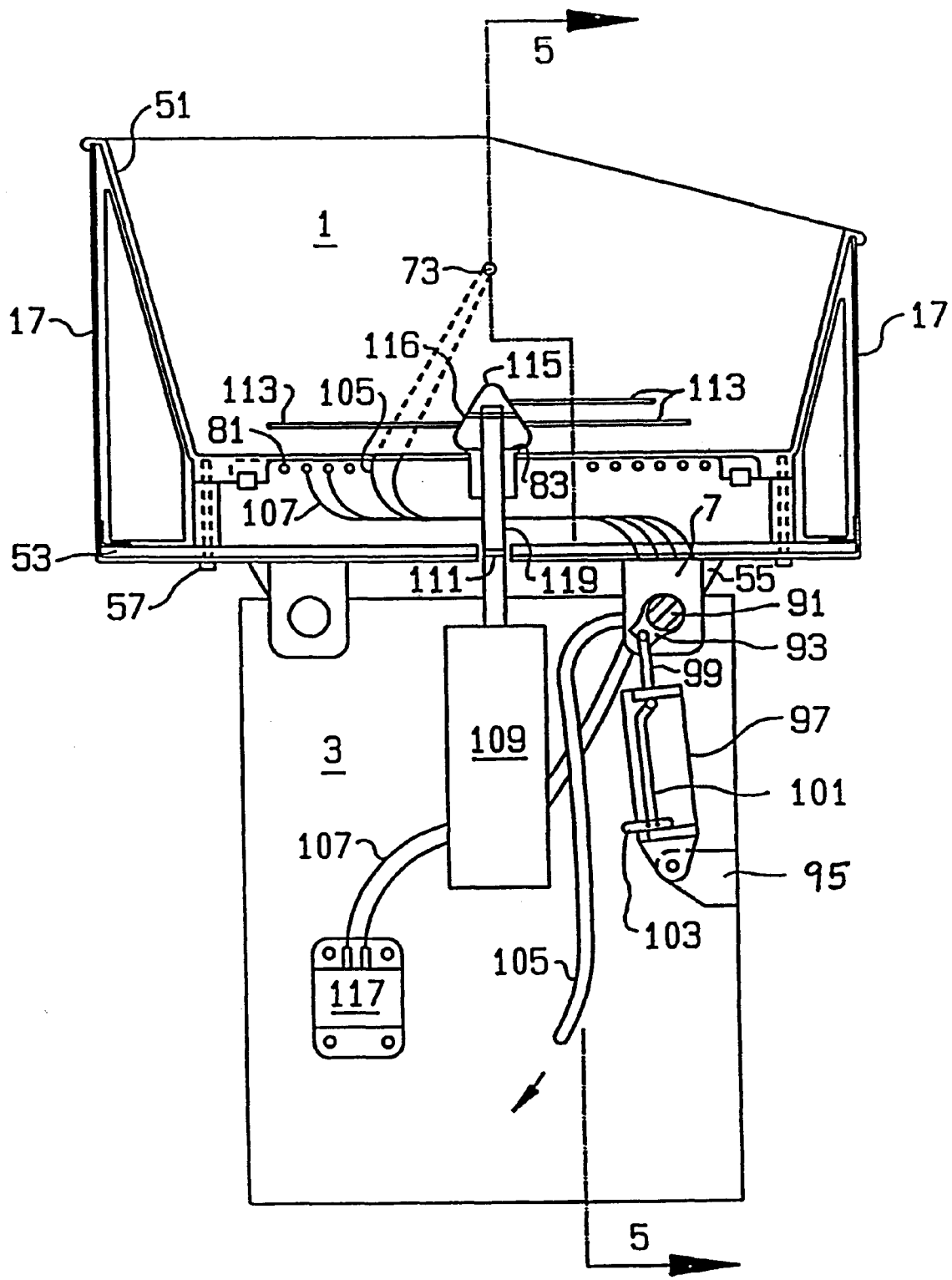
FIG. 4(a) shows a cross section of the housing and the attached kettle assembly of FIG. 1.

Bowl 51, base 53, and sheathing 17 are shown in FIG. 4(a). An important aspect of this invention is the controlled pivoting of the kettle assembly. On the one hand, this i 15 possibly heavy assembly may be tiring to pivot manually. On the other hand, if not properly designed, this assembly has the tendency to fall backward or forward at the extremes of its ranges. This would cause vibration and bouncing, which may dent or damage the structure. Thus one facet of controlled pivoting is the control of manual kettle assembly motion with a damper mechanism integrated with the pivot means. Another facet of controlled pivoting is the provision of an active pivoting force on the kettle by a pivoting mechanism. In this latter case, kettle assembly pivoting would be either entirely automatic or the operator would need to exert only a reduced, minimal smooth force to pivot the kettle assembly without risk of vibration or bounce. Both of these mechanisms, damping and pivoting, of controlled pivoting are unified in a cylinder and piston arrangement 97 in the preferred version. In other versions, this arrangement can be replaced with any mechanism, mechanical or electromechanical, capable of generating both a frictional resistance to rotation and a positive rotational force in alternate controllable configurations. Another damping mechanism is mounted on the top surface of the base housing 3 to provide for controlled motion of the kettle assembly as it approaches a substantially horizontal position from a substantially vertical position. This damping mechanism will be discussed in connection with FIGS. 4(b) and 4(c).

Hollow pivot axle 91 extends from front support leg 7 to back support leg 55. It is supported by bushings 135 in the base housing 3. Fixed to the pivot axle is bracket 93 with a rotatable pivot point; bracket 95, also having a rotatable pivot point, is fixed to the right face of the base housing. Attached between the pivot points of these brackets is cylinder and piston arrangement 97. Piston shaft 99 of the cylinder is pivotally attached to the pivot point of bracket 93 attached to pivot axle 91. The base of the cylinder is pivotally attached to the pivot point of bracket 95.

When the piston and cylinder arrangement is configured as a damping mechanism, tubing 101 conducts hydraulic fluid between ends of this cylinder as the piston moves. Preferably, this fluid is light lubricating oil. Valve means 103 is included in this fluid path. By restricting this path with valve means 103, the resistance to fluid flow is increased and the damping resistance is increased. And conversely, if the path is less constricted, the fluid flows more easily and the damping resistance is decreased. In this manner, the characteristics of the pivoting of the kettle assembly can be adjusted to the weight of the kettle and the preferences of the operators.

When the piston and cylinder arrangement is configured as a pivoting mechanism, tubing 101 attached to a pressurized pneumatic supply. Pneumatic pressure applied through controlling valve means then forces the piston to pivot the kettle assembly in either direction as desired.

In the preferred version, the same cylinder and piston arrangement can be configured for either function.

Cooking oil conduit 105 passes from the reservoir along a path extending from the base housing, through the pivot means as will be described below, into the kettle assembly, and finally along the side of the bowl to oil injection nozzle 73. Through this conduit, melted cooking oil is conducted by a pump in the reservoir to the popping bowl without air exposure or possibility of spillage. This tube must be of a heat resistant, flexible, and abrasion resistant material. In the preferred version, this is a Teflon™ tube protected with stainless steel mesh over its outer surface.

Heating element power relay 117 is placed on a wall of the base housing. Power wires 107 to the heating elements pass though the pivot means following the same course as the oil conduit. In the kettle assembly, the wires connect to the heating elements. The wires have sufficient slack to permit removal of the popping bowl.

Also illustrated is the agitator mechanism. This mechanism insures that the corn kernels become uniformly coated with cooking oil and further that all the kernels are uniformly heated. A conventional electric motor 109 is mounted in the base housing with a shaft protruding to junction 111, where the motor shaft junctions with rotor shaft 119. This junction in the preferred version is a simple key and slot combination. Agitator rods 113 are Teflon™ coated and carried by hub 115. The hub 115 connects to rotor shaft 119 with pin 116 for easy removal. Bushing 83 (also shown in FIG. 3) guides rotor shaft 119 through the base of the bowl. Bushing 83 has raised shoulder to prevent any layer of accumulated cooking oil in the base of the bowl from exiting out along rotor shaft 119.

Figure 4B:
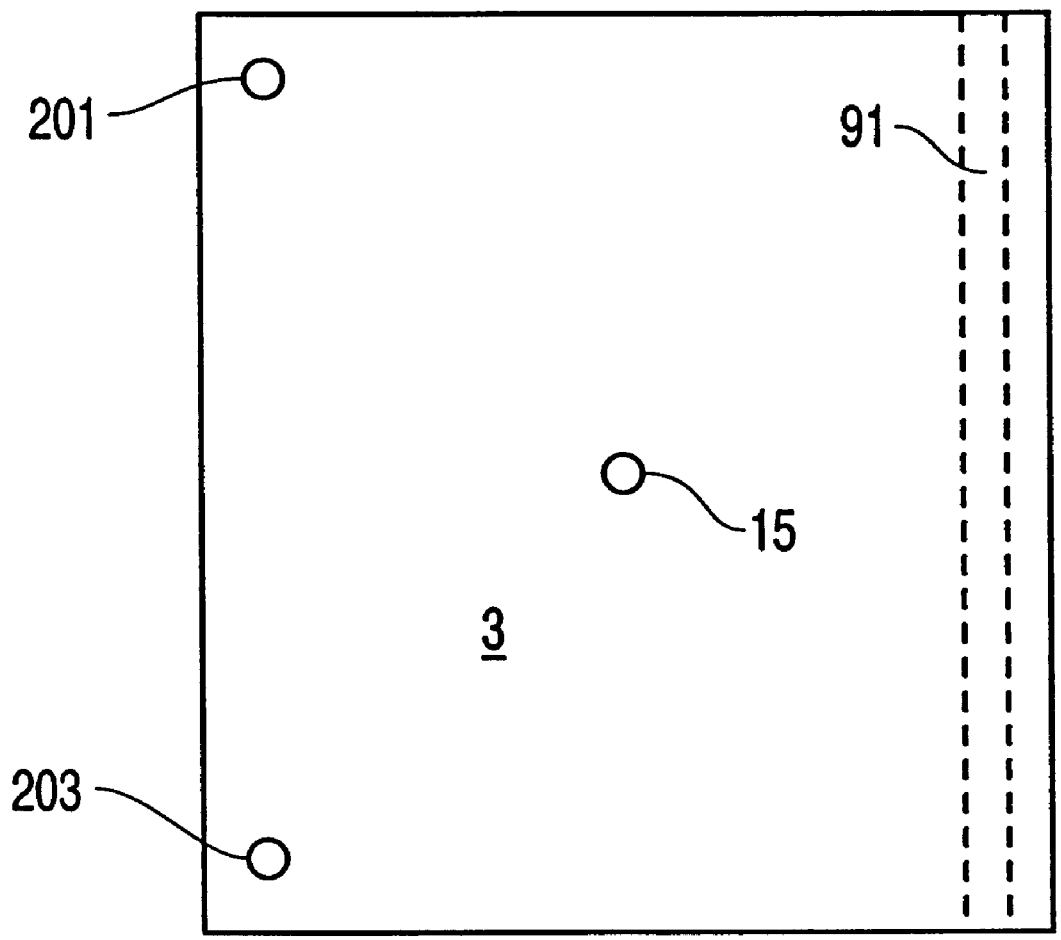
FIG. 4(b) shows a top view of the housing.

FIG. 4(b) shows a top view of the base housing. The location of pivot axle 91, which is mounted below the top surface of the base housing, is illustrated on the right hand portion of the top surface of the base housing 3, and the agitator shaft 15 is shown at the center of the top surface of the base housing. A second damping means 203 provides for controlled motion of the kettle assembly relative to the base housing as the kettle pivots towards a substantially horizontal position from a substantially vertical position. In this manner, the kettle assembly pivots towards its substantially horizontal position in a controlled, smooth motion.

Footpad 201 assists in supporting the kettle assembly at its substantially horizontal position. This footpad should be mounted such that an upper surface of the footpad is located below the height of an upper surface of the damping means 203 such that the base member of the kettle assembly will contact the damping means 203 before contacting the footpad. This arrangement avoids damage to the kettle assembly caused by the impact of the kettle assembly onto the footpad before the downward movement of the kettle assembly is slowed by damping means 203. The kettle assembly 203 rests on damping means 203 and footpad 201 in its substantially horizontal position.

Figure 4C:
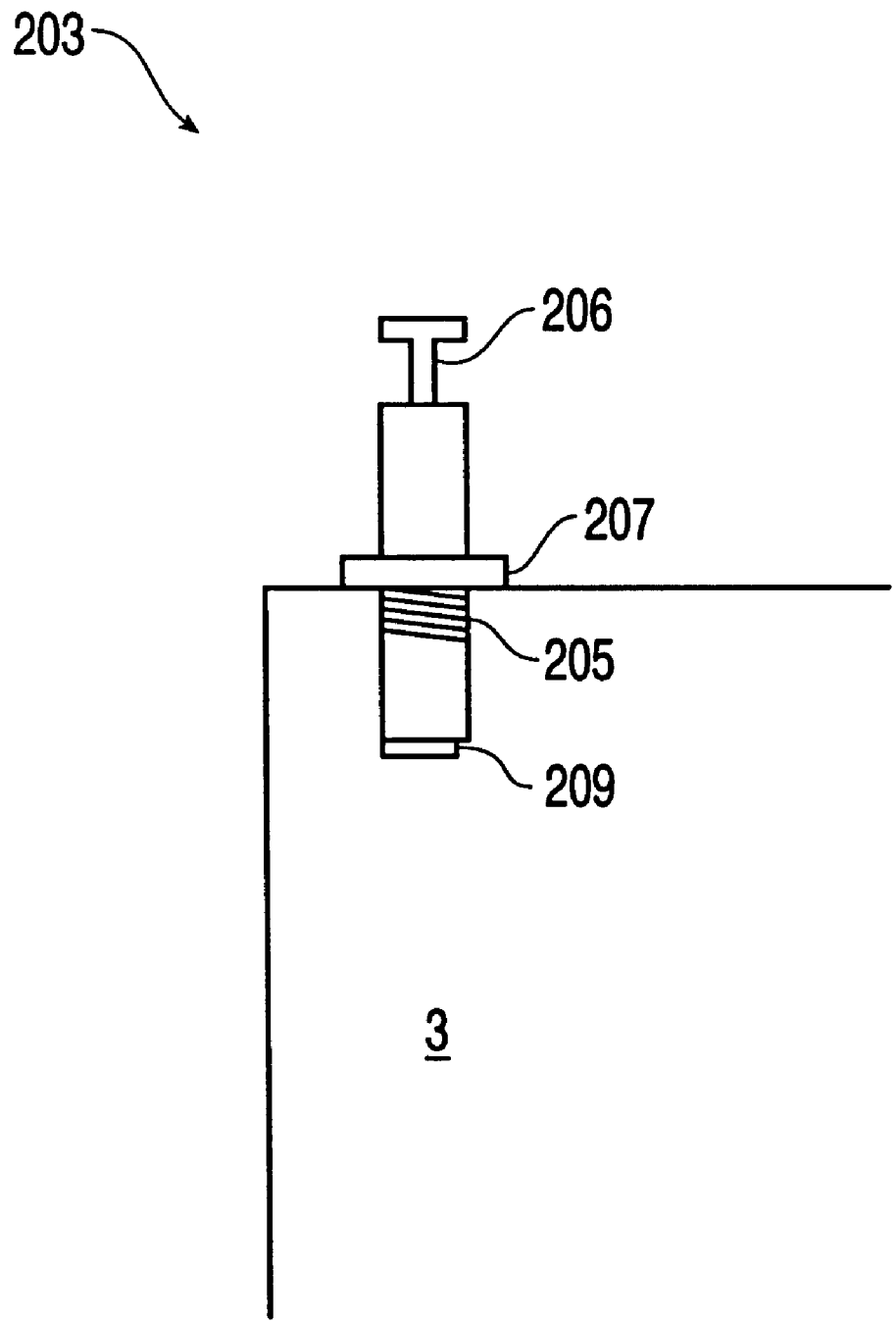
FIG. 4(c) shows a view of a section of the housing with a damping means mounted on a top surface of the housing.

FIG. 4(c) shows a cross-section of a portion of the base housing, with its side panel removed, with damping means 203 mounted on a top surface of the base housing. Other elements of the popping apparatus are not shown in this figure so as to more clearly illustrate damping means 203.

Damping means 203 includes a pin or piston shaft 206 which has an upper surface which the kettle assembly contacts as the kettle assembly pivots from a substantially vertical position to a substantially horizontal position. Once the kettle assembly contacts the pin or piston shaft 206 of the damping means, the downward vertical motion of the pin or piston shaft 206 within the body of the damping means is slowed by hydraulic fluid in the body of the damping means. In this manner, damping means 203 provides a resistance force so as to provide for a controlled, smooth motion for the kettle assembly as it pivots towards a substantially horizontal position.

In a preferred embodiment, the body of damping means 203 has a threaded section 205 that accepts a nut 207 such that the damping means is secured to the base housing.

Advantageously, damping means 203 may be adjusted to lessen or strengthen the resistance force provided by turning an adjustment screw or dial 209 located on a bottom portion of the damping means. Such adjustment restricts or opens up a fluid path in the body of the damping means 203 to increase or decrease the resistance force provided by the damping means. The adjustment screw is easily accessible by removing the front panel of the base housing.

In a preferred embodiment damping means 203 is comprised of a cylinder and piston arrangement, but any suitable damping means which is capable of slowing the pivoting motion of the kettle assembly towards a horizontal position may be utilized.

In a less preferred embodiment, footpad 201 of FIG. 4(*b*) could be replaced with a third damping means similar in structure to the damping means 203. In this manner, the downward pivoting motion of the kettle assembly would be slowed by two damping means mounted on the top surface of the housing.

Further, in a less preferred embodiment, damping means 203 could be mounted in a location on the top surface of the housing that is substantially between the positions of footpad 201 and damping means 203 illustrated in FIG. 4(*b*). Such a damping means could have an elongated bar extending parallel to the base of the kettle assembly for operative association with the base of the kettle assembly. In this manner, the damping means could act as both a means to slow the pivoting motion of the kettle assembly and, as a support mechanism for the kettle assembly once it reaches a substantially horizontal position. Such a configuration could eliminate the need for any footpad. Alternatively, a footpad could be mounted on the top surface of the housing to assist in supporting the kettle assembly in a substantially horizontal position, once the pivoting motion of the kettle assembly is slowed by this more centrally located damping means.

Figure 5:
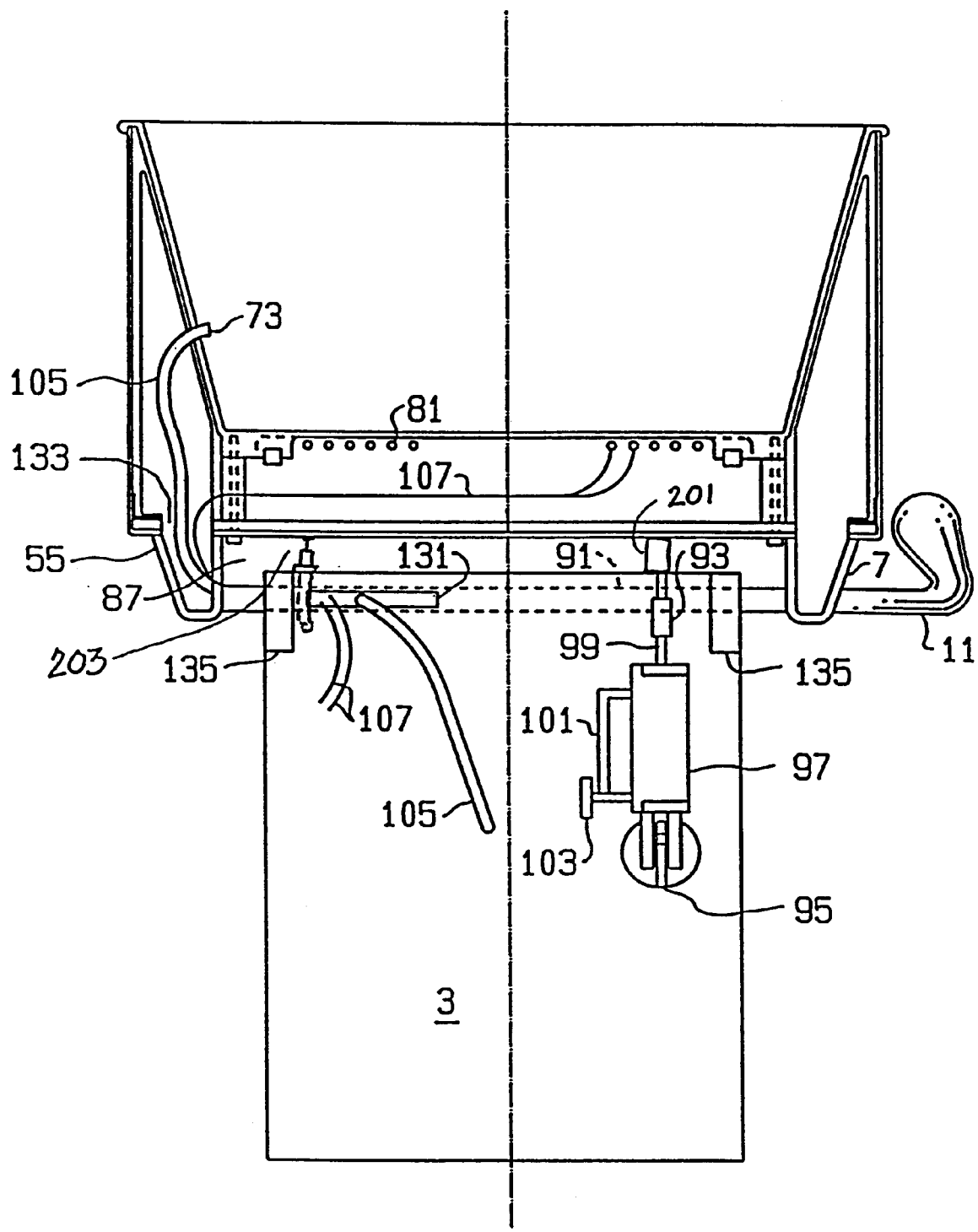
FIG. 5 shows details of the pivot means taken along lines B—B of FIG. 1.

FIG. 5 shows the detailed course of the kettle feeds. The hollow pivot axle 91 supports the kettle assembly through support legs 7 and 55. The axle is in turn supported by bushings 135 in base housing 3. Pivot handle 11 is attached to the axle for pivoting the kettle assembly. The cylinder and piston arrangement connected to the pivot axle is at 97. Damping means 203 and footpad 201 are shown supporting the kettle assembly in its substantially horizontal position. The brackets 93 and 95 are shown in face view with the pivot points demonstrated. Valve means 103 is in the preferred version a valve restricting the flow of hydraulic oil in oil tube 101. Cooking oil conduit 105 is positioned between bowl aperture 73 and the oil reservoir. Heating element wires 107 are connected to heating element 81 in a conventional manner.

These feeds pass into the tubular, hollow pivot axle 91 through slot 131. The sides of this slot are lined to prevent any possible abrasion of these feeds as they pass along the axle and out into hollow rear support leg 55. This support leg 55 communicates with space 87 in the kettle assembly between the bowl and the base. The feeds are distributed to their targets in this space. In addition, wires to the thermocouple sensor and the thermostat pass along the same course to the heating element controls.

An advantage of this design is that the high current feed to the heating elements is entirely without mechanical connections. Mechanical connections, such as slip rings, used in prior devices often undergo slight arcing, consequent oxidization, followed by resistive heating and more oxidization. This process terminates in connector failure. The high current path of this invention is more reliable as it has no mechanical intermediate connections. Additionally, the control path is entirely without electromechanical components.

Thermal control is handled by solid state circuits. Repeated cycling of a bimetallic thermocouple as used in prior devices can lead to failure by the same mechanism causing mechanical contacts to fail. Only the safety thermocouple in this invention is electromechanical, and ideally it will never open. Thus the electrical circuits of this invention are considerably more reliable the prior devices employing mechanical elements.

Figure 6:
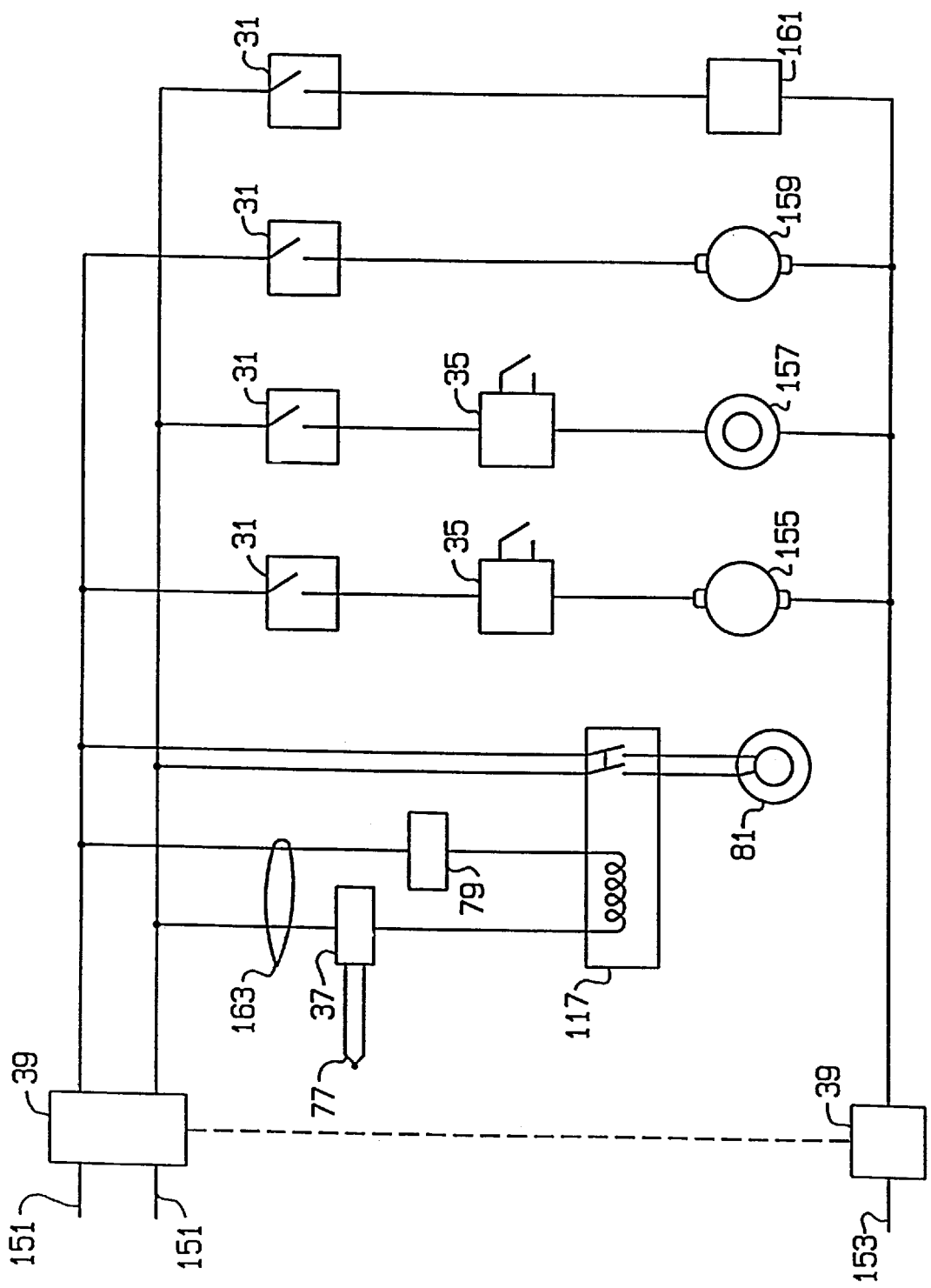
FIG. 6 shows the electrical diagram of the invention of FIG. 1.

The preferred version of this invention utilizes manual controls. FIG. 6 is a schematic circuit of one version of these controls. Other essentially equivalent circuits can easily be developed. Further, programmed logic control would allow essentially automatic operation of the apparatus. These would be especially useful with the cylinder and piston means configured as a pivoting mechanism to automatically pivot the kettle assembly. Turning to the specifics of FIG. 6 shown are high voltage feeds 151 and neutral feed 153. The apparatus master switch and circuit breaker 39 controls overall power to the apparatus. Switches 31 control individual apparatus components. In the preferred version these are breaker switches for additional safety. Push button switches 35 activate timers of appropriate duration to melt the cooking oil in its reservoir and to inject an amount of cooking oil into the popping bowl sufficient to pop a load of corn. The oil pump motor 155 and the oil heater element 157 are shown. The agitator motor 159 is activated by a switch. The components 161 of an associated popcorn merchandiser are controlled by a last switch and a feed from this apparatus.

The popping bowl heating elements 81 can be sized from 4 to 10 KW. Relay 117 is adapted to repetitive high current applications. In the preferred version it is a mercury relay. The relay is controlled by circuit 163 which has a thermal element in each leg. Safety thermostat 79 is set to open the relay when an excessive temperature is reached. In the preferred version this safety shut-off temperature is approximately 475° F. Thermocouple temperature sensor 77 is paired with thermocouple control module 37. In the preferred version 37 is a Model 1603 of Chromalox, Inc. (Lavergne, Tenn.). Both 77 and 79 are attached to the popping bowl. Acting together 37 and 77 and the thick cast aluminum popping bowl permit precise, accurate, and adjustable temperature control, easily to within ±3° F. Prior devices often do not employ a sensor and controller combination, and thus offer only a fixed temperature setting controllable only to no better than ±10° F. in a sheet metal popping bowl.

The prior detailed description is of one preferred embodiment of the apparatus of this invention. Other embodiments will be apparent to one of skill in the art, all of which are equally in the spirit of this disclosure and equally covered by the appended claims.

What is claimed is:

1. An apparatus for popping corn comprising:
   a bowl including a bottom portion, a sidewall, and an aperture in the sidewall for entry of cooking oil;
   a lid to restrain popping corn therein;
   a supply of cooking oil; and
   a conduit in fluid association with the supply of cooking oil and extending to the sidewall aperture of the bowl for delivering oil thereto, wherein the aperture has a screen so the unpopped kernels do not become lodged in the aperture.

2. The apparatus of claim 1, wherein the lid has two pieces.

3. The apparatus of claim 2, wherein one piece of the lid is hinged to the other piece of the lid.

4. An apparatus for popping corn comprising:

a bowl including a bottom portion, a sidewall, and an aperture in the sidewall for entry of cooking oil;

a lid to restrain popping corn therein, wherein the lid has two pieces;

a supply of cooking oil; and a conduit in fluid association with the supply of cooking oil and extending to the sidewall aperture of the bowl for delivering oil thereto, wherein the aperture has a diameter which is smaller than that of unpopped corn kernels so the unpopped kernels do not become lodged in the aperture.

5. The apparatus of claim 4, wherein the aperture has a diameter which is between ⅛" and ¼".

6. The apparatus of claim 4, which further comprises a housing for supporting the bowl; and a pivotable connection between the bowl and the housing so that the bowl can pivot between substantially vertical and substantially horizontal positions.

7. The apparatus of claim 4, wherein the lid has two pieces.

8. The apparatus of claim 4, wherein one piece of the lid is hinged to the other piece of the lid.

* * * * *